United States Patent
Lakshmanan et al.

(10) Patent No.: US 10,417,580 B2
(45) Date of Patent: Sep. 17, 2019

(54) ITERATIVE REFINEMENT OF PATHWAYS CORRELATED WITH OUTCOMES

(71) Applicant: INTERNATIONAL BUSINESS MACHINES CORPORATION, Armonk, NY (US)

(72) Inventors: Geetika T. Lakshmanan, Winchester, MA (US); Szabolcs Rozsnyai, New York, NY (US); Fei Wang, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 828 days.

(21) Appl. No.: 15/054,681

(22) Filed: Feb. 26, 2016

(65) Prior Publication Data

US 2016/0180253 A1    Jun. 23, 2016

Related U.S. Application Data

(63) Continuation of application No. 14/070,092, filed on Nov. 1, 2013, now Pat. No. 9,299,035.

(51) Int. Cl.
*G06N 20/00* (2019.01)

(52) U.S. Cl.
CPC .................... *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 7,895,323 B2 | 2/2011 | Gupta et al. | |
| 7,979,844 B2 | 7/2011 | Srinivasan | |
| 8,082,220 B2 | 12/2011 | Hadad et al. | |
| 8,321,251 B2 | 11/2012 | Opalach et al. | |
| 8,396,884 B2 | 3/2013 | Singh et al. | |
| 8,402,444 B2 | 3/2013 | Ball et al. | |
| 9,299,035 B2* | 3/2016 | Lakshmanan | G06N 99/005 |
| 9,563,335 B1* | 2/2017 | DeLuca | G06F 3/0482 |
| 9,667,577 B2* | 5/2017 | DeLuca | H04L 51/12 |
| 9,672,297 B1* | 6/2017 | DeLuca | G06F 3/0482 |
| 9,736,199 B2* | 8/2017 | Chang | H04L 65/403 |
| 9,754,049 B2* | 9/2017 | Tong | H04L 29/08 |
| 9,798,766 B2* | 10/2017 | DeLuca | G06F 3/0482 |
| 9,860,336 B2* | 1/2018 | DeLuca | H04W 4/029 |
| 9,984,161 B2* | 5/2018 | Lakshmanan | G06Q 10/00 |

(Continued)

OTHER PUBLICATIONS

ScienceDirect Elsevier Control Engineering Practice vol. 11, Issue 7, Jul. 2003, pp. 733-764 A survey of industrial model predictive control technology S.Joe Qin, Thomas A. Badgwell.*

(Continued)

*Primary Examiner* — Michael B Holmes
(74) *Attorney, Agent, or Firm* — Tutunjian & Bitetto, P.C.; Rahan Uddin

(57) ABSTRACT

Methods and systems for refining a process model include determining whether the process model is too dense or too sparse. A predictive model is learned from execution traces to predict an outcome. The predictive model is modified responsive to the determination of whether the process model is too dense or too sparse. A refined process model is refined from updated traces based on attributes present in the modified predictive model.

20 Claims, 4 Drawing Sheets

(56) References Cited

U.S. PATENT DOCUMENTS

| | | | |
|---|---|---|---|
| 9,990,341 B2* | 6/2018 | DeLuca | G06F 3/0482 |
| 9,998,550 B2* | 6/2018 | Chang | H04L 67/16 |
| 10,068,204 B2* | 9/2018 | Gou | G06Q 50/01 |
| 10,083,402 B2* | 9/2018 | Lakshmanan | G06N 20/00 |
| 10,123,748 B2* | 11/2018 | Li | A61B 5/7275 |
| 10,127,300 B2* | 11/2018 | Smith | G06F 16/285 |
| 10,148,712 B2* | 12/2018 | Lakshmanan | G06Q 10/10 |
| 10,168,917 B2* | 1/2019 | Dai | G06F 3/0616 |
| 10,181,012 B2* | 1/2019 | Duftler | G16H 40/20 |
| 10,216,778 B2* | 2/2019 | Wang | G06F 16/9014 |
| 10,242,085 B2* | 3/2019 | Wang | G16H 10/60 |
| 10,248,699 B2* | 4/2019 | Pal | G06Q 50/01 |
| 2005/0138483 A1 | 6/2005 | Hatonen et al. | |
| 2006/0293940 A1 | 12/2006 | Tsyganskiy et al. | |
| 2010/0267102 A1 | 10/2010 | Begin et al. | |
| 2011/0167412 A1 | 7/2011 | Kahlon et al. | |
| 2012/0101974 A1 | 4/2012 | Duan et al. | |
| 2013/0103441 A1 | 4/2013 | Doganata et al. | |
| 2013/0103719 A1 | 4/2013 | Gotz et al. | |

OTHER PUBLICATIONS

Alves De Medeiros, A., et al. "Process Mining Based on Clustering: A Quest for Precision" Business Process Management Workshops. Sep. 2007. (12 Pages).

Cornelissen, B., et al. "Execution Trace Analysis Through Massive Sequence and Circular Bundle Views" Deft University of Technology—Software Engineering Research Group: Technical Report Series. Feb. 2008. pp. 1 -40.

Gunther, C., et al. "Fuzzy Mining—Adaptive Process Simplification Based on Multi-Perspective Metrics" Business Process Management 2007. Sep. 2007. pp. 328-343.

Kahlon, V., et al. "Universal Causality Graphs: A Precise Happens-Before Model for Detecting Bugs in Concurrent Programs" Computer Aided Verification, 22nd International Conference, CAV 2010. Jul. 2010. pp. 1-17.

Karegowda, A., et al. "Comparative Study of Attribute Selection Using Gain Ratio and Correlation Based Feature Selection" International Journal of Information Technology and Knowledge Management, vol. 2, No. 2. Jul. 2010. pp. 271-277.

Lakshmanan, G., et al. "Leveraging Process Mining Techniques to Analyze Semi-Structured Processes" IT Professional, vol. 15, Issue 5. Sep. 2013 pp. 1-13.

Lakshmanan, G., et al. "Predictive Analytics for Semi-Structured Case Oriented Business Processes" BPM 2010 Workshops. Sep. 2010. pp. 640-651.

Rosstad, T., et al. "Development of a Patient-Centred Care Pathway Across Healthcare Providers: A Qualitative Study" BMC Health Services Research 2013. Apr. 2013. pp. 1-9.

Song, M., et al. "Trace Clustering in Process Mining" Proceedings of the 4th Workshop on Business Process Intelligence (BPI'08), BPM Workshops 2008. Sep. 2008. pp. 1-12.

Taylor, J. "Simplifying Over-Complex Processes" Decision Management Solutions. Dec. 2010. (51 Pages) Available at: http://www.slideshare.net/jamet123/simplifying-over-complex-processes-with-decision-management.

Van Der Aalst, W., et al. "Process Mining" Communications of the ACM, vol. 55, No. 8. Aug. 2012. pp. 76-83.

Van Dongen, B., et al. "The Prom Framework: A New Era in Process Mining Tool Support" 6th International Conference, ICATPN 2005. Jun. 2005. pp. 444-454.

Yang, W., et al. "A Process-Mining Framework for the Detection of Healthcare Fraud and Abuse" Expert Systems with Applications, vol. 31, Issue 1. Jul. 2006. pp. 56-68.

Duftler, M., et al. "Extracting Clinical Care Pathways Correlated With Outcomes" U.S. Appl. No. 13/851,755, filed Mar. 27, 2013. (32 Pages).

Lakshmanan, G., et al. "Pruning Process Execution Logs" U.S. Patent Application filed concurrently on Nov. 1, 2013. (23 Pages).

* cited by examiner

ITERATIVE REFINEMENT OF PATHWAYS CORRELATED WITH OUTCOMES

BACKGROUND

Technical Field

The present invention relates to the refinement of process models and, in particular, to changing the density of a causal graph.

Description of the Related Art

An execution trace describes events occurring in an instance of some process. These events include tasks that are executed in the process, as well as data values input or output by the tasks. Process mining involves mining a graph of causal behavior from process execution logs and produces a process model as output. A process model may be represented by a causal graph of nodes and edges, where nodes are tasks in a process and edges represent the causality between the tasks. The model may also have gateways that show execution semantics along the edges and nodes of the graphs, such as parallelism or exclusive flows.

Process models can be mined from a set of execution traces. A mined process model could be very complex, with many nodes and edges and display spaghetti-like behavior where rarely-used or redundant paths clutter the graph. In one example, a process model could represent a pathway, such as a treatment pathway. One way to accomplish this is to find a set of execution traces that lead to a particular outcome and then mining a process model from these traces.

SUMMARY

A method for refining a process model includes determining whether the process model is too dense or too sparse. A predictive model is learned from execution traces to predict an outcome. The predictive model is modified responsive to the determination of whether the process model is too dense or too sparse. A refined process model is refined from updated traces based on attributes present in the modified predictive model.

A system for mining a process model includes a predictive model module configured to learn a predictive model to predict an outcome from the execution traces. A model refinement module comprising a processor is configured to determine whether the process model is too dense or too sparse, to modify the predictive model responsive to said determination, and to trigger the mining module to mine a refined process model from updated traces based on attributes present in the modified predictive model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles iteratively refine pathways mined from execution traces. A pathway may be represented by a process model mined on execution traces of process instances, where the pathway tracks a sequence of nodes through the graph that leads to a particular outcome, where the outcome could be a particular task such as "Patient Hospitalized." The outcome is specified by a user. In particular, the process model may be represented as a causal graph that includes attributes correlated with a user-specified outcome. The outcome is present as a task in the execution traces and will be present in the causal graph as a common exit point for each possible pathway in the process model.

Once a process model has been mined, a user or the system may determine that that the pathway is too dense and complex. When this determination is made, a predictive model, P, is learned from the execution trace set from which the pathway is mined. The probabilistic process that was used to learn the predictive model is adjusted in response to the desired complexity, and the predictive model is relearned as P'. The model provides a ranking of attributes correlated with the outcome. A subset A of the attributes is selected, and a pathway is mined from the traces, where the trace attributes are restricted to the attribute subset A. Alternatively, instead of re-learning the predictive model, a smaller subset of attributes is extracted from A and the pathway is mined again.

The present embodiments provide iterative refinement of pathways, where information not relevant to the pathway outcome is removed. A user-guided approach allows users to control the level of refinement and number of iterations to reach a desired level of complexity.

Figure 1:
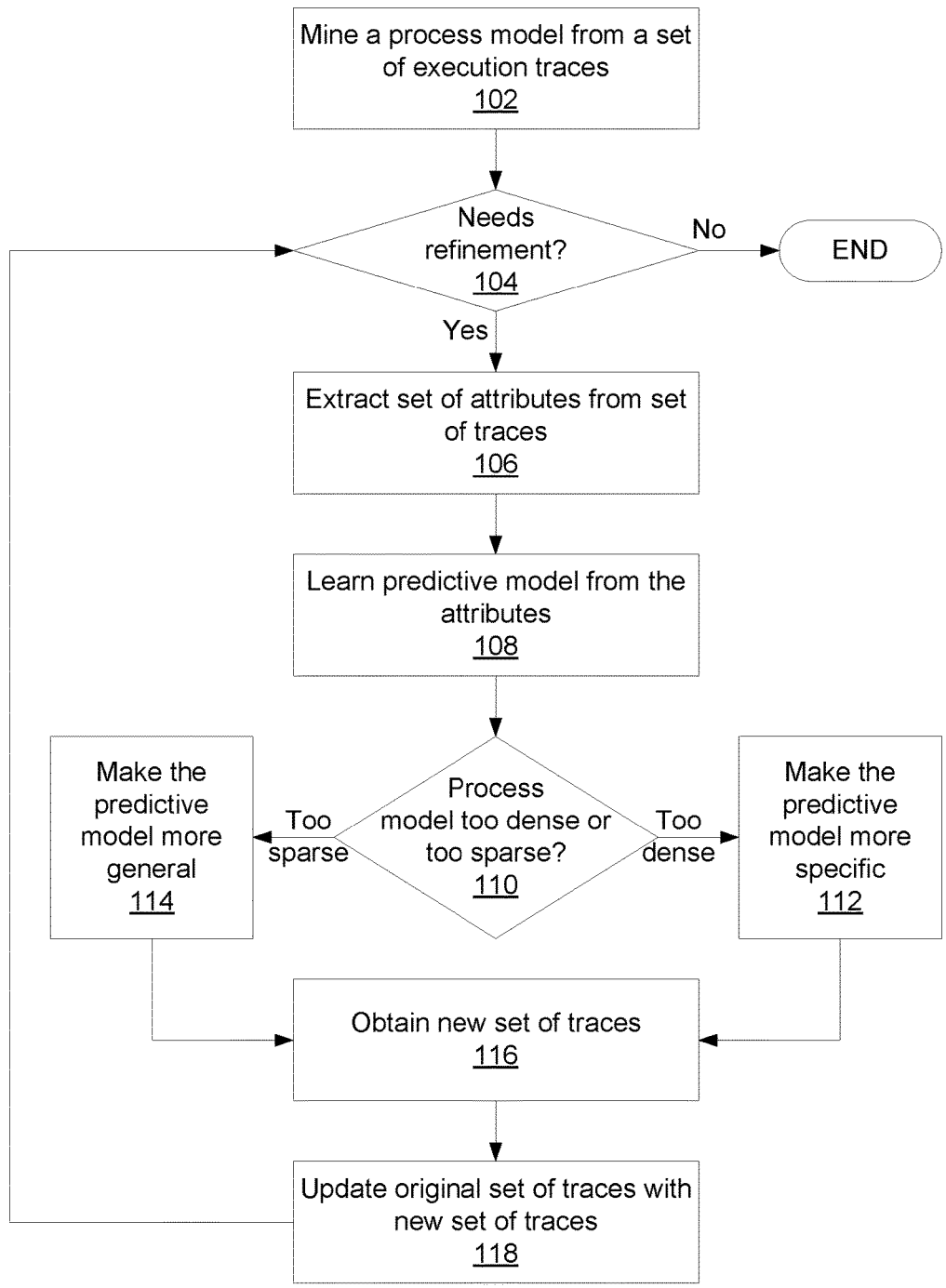
FIG. 1 is a block/flow diagram of a method for mining and refining a process model in accordance with the present principles.

Referring now to the drawings in which like numerals represent the same or similar elements and initially to FIG. 1, a method for refining a process model is shown. Block 102 receives a set of execution traces as input, with the execution traces all relating to a user-specified outcome. An execution trace of a process captures all tasks that occur in the process and any data exchanged (input and output) by each task. So, for example, a number of different process steps may take place between an initial condition and the selected outcome—these steps are tracked and each example represents a separate execution trace. Block 102 mines the execution traces to produce a process model that represents the different possible pathways. The structure of a process model may be, e.g., a directed graph, as described in greater detail below. Each execution trace may be represented in the process model as a path along the directed graph.

There are several process mining techniques available, and those having ordinary skill in the art would be capable of selecting an appropriate mining technique for their application. For example the Alpha algorithm can mine a Petri net from process execution traces. Similarly, the HeuristicMiner can mine a Heuristic graph from process execution traces.

The Petri Net and Heuristic Graph are each different examples of a process model.

At block 104, a user determines whether the process model needs further refinement. Alternatively, a system may automatically make this determination by comparing an appropriate density measure to a threshold. For example, a graph's density can be characterized by the average number of edges going into and out of a node. The higher this average number, the greater the density of the graph. If no refinement is needed, the method ends and the process model are produced as output. If further refinement is needed, block 106 extracts a set of attributes from the set of traces. In one exemplary embodiment, the attributes represent individual nodes on the graph and may therefore be identified as steps in the execution traces. Attributes may also represent data values that describe the overall state of the execution trace without forming a discrete step of the trace.

Block 108 learns a predictive model from the extracted attributes. The predictive model is formed by applying machine learning over the execution traces and may be represented as, e.g., a decision tree. A predictive model such as a decision tree can be learned on the basis of a matrix of values, where each column is an attribute and each row is a different execution trace. In one example, attributes that are present in an execution trace are represented by values of 1, while attributes that are not present in the trace are represented by values of 0. As an alternative to the binary-valued attribute matrix, the matrix may instead have a continuous value range or some set of discrete range options.

If block 110 determines that the process model is too dense, processing proceeds to block 112 which makes the predictive model more specific. If the process model is too sparse, block 114 instead makes the predictive model more general. Specific processes to alter the predictive model are discussed in detail below. Block 116 then extracts a new set of execution traces from the new predictive model. Block 118 uses the new traces to update the original set of traces and processing returns to block 104. For example, using the information gleaned from increasing or decreasing the density of the process model, the execution traces may be mined again with additional logic that helps determine whether a given attribute belongs on the new process model.

Making the predictive model more specific may include reducing the number of unique attributes used by the model to predict a specific outcome. The model is trained on the entire attribute set, and the learned model depicts attributes correlated with the outcome. The reduction of attributes occurs on this attribute set that has already been determined to be correlated with the outcome during the training phase of the model. Making the predictive model more general may include increasing the number of unique attributes used by the model to predict an outcome. Increasing means that additional attributes, if not already incorporated in the model, are selected from the set of attributes that have been determined in the training phase of the model to be correlated with the outcome.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
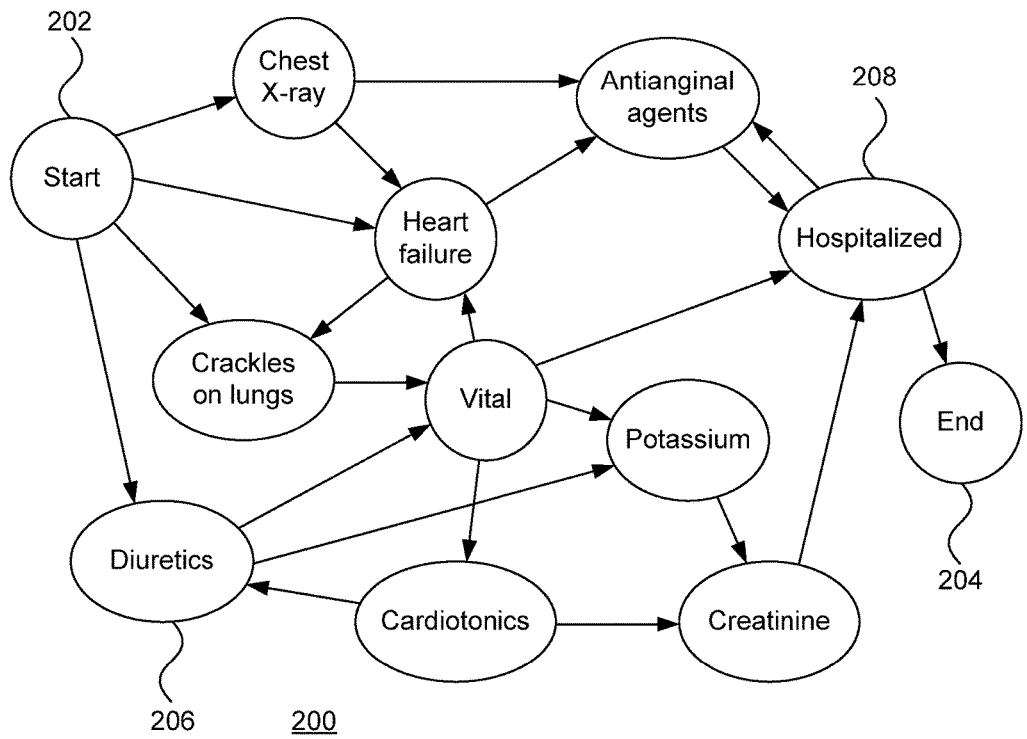
FIG. 2 is a diagram of a process model in accordance with the present principles.

Referring now to FIG. 2, an exemplary process model 200 is shown. In this example, a process model 200 is mined from traces of patients who are hospitalized. A goal of such an exercise could be to view the care pathways leading to hospitalization. The process model has a beginning node 202 and an ending node 204 with one or more nodes 206 in between. The process model 200 is characterized by its ending condition 208.

The predictive model mentioned in 108 can be used to determine which attributes 206 are important in predicting hospitalization on this set of execution traces. Here the term attributes is used to indicate a task or data variable that is extracted from the raw data. For example, the task Diuretics is an attribute, and it may have a value associated with it such as 3 mg (indicating the dosage of Diuretics medication prescribed). A process instance or trace may also have instance level data attributes associated with it. For example, the "Diuretics" node may have an associated dosage.

In the present example, the process model 200 describes potential process flows for patients with heart problems. Each path through the graph represents a different potential execution trace, each ending with the condition of being hospitalized. For example, a patient may have a chest x-ray, may subsequently suffer heart failure, be given Antianginal agents, and then may be hospitalized. In an alternative execution trace, the patient may be given Diuretics, followed by Potassium, followed by Creatinine, and then be hospitalized.

An exemplary matrix to represent some execution traces that can be used to train a predictive model, from which the process model 200 can be mined, is shown below at table 1.

TABLE 1

| Traces | Diuretics_Amount | Diuretics | Antianginal Agents | Heart Failure | Potassium |
|---|---|---|---|---|---|
| Trace 1 | 4 | 1 | 1 | 0 | 0 |
| Trace 2 | 6 | 1 | 0 | 1 | 1 |

As can be readily seen from FIG. 2, a process model mined from such execution traces can quickly grow dense and difficult to read. The many interconnections make it difficult to parse out meaningful execution traces. In a case such as this, the user may determine that the process model 200 is too dense and should be made more specific. The process model shows an aggregate care pathway for treating the patients.

Figure 3:
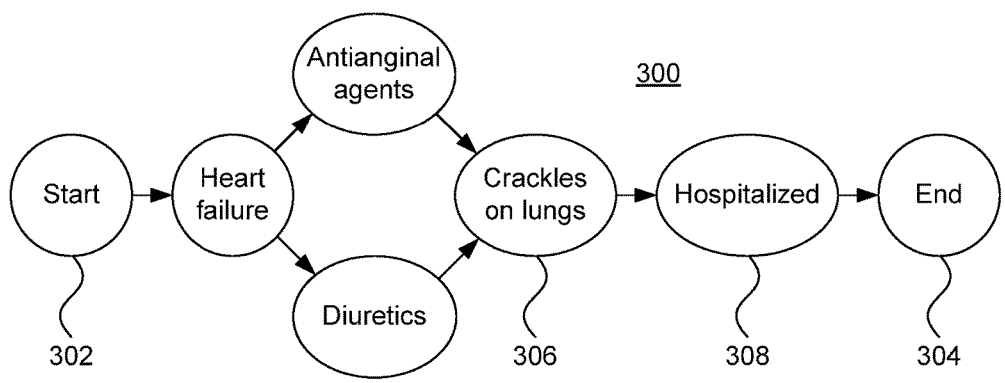
FIG. 3 is a diagram of a refined process model in accordance with the present principles.

Referring now to FIG. 3, a refined process model 300 is shown. As with the process model 200 described above, the refined model 300 has a beginning node 302 and an ending node 304 and is made up of attributes 306. The refined model 300 has the same target condition 308 as the original model, but the number of attributes 306 is much smaller.

It should be noted that the refined process model 300 need not preserve the exact control flow of the original process model 200. The refined model gives a simplified potential sequence of events, with the understanding that some events may be missing. Process mining provides a heuristic model, meaning it is a best attempt and need not be a perfectly correct representation of the pathway.

Figure 4:
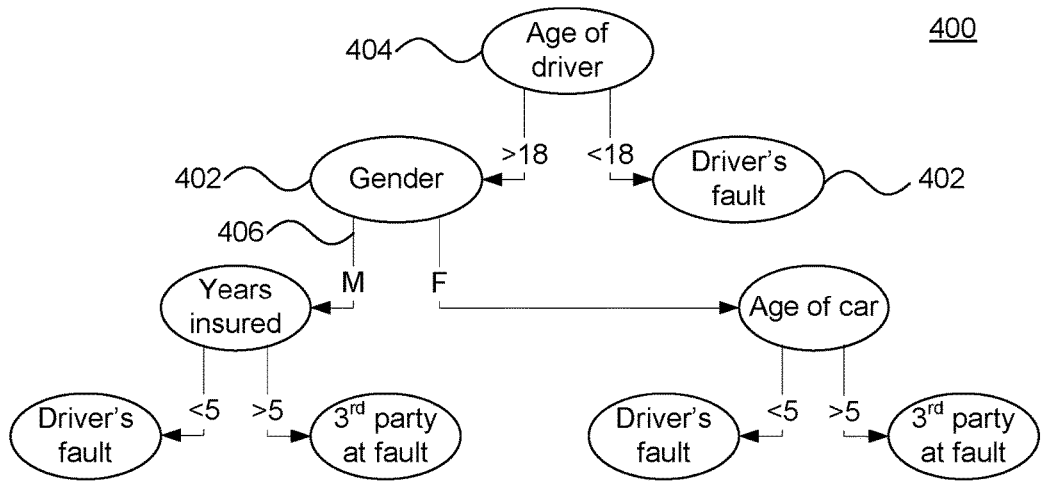
FIG. 4 is a diagram of a predictive model in accordance with the present principles.

Referring now to FIG. 4, a decision tree 400 is shown that represents a predictive model. Block 108 of FIG. 1 describes learning a predictive model from the attributes of a process model. A number of different machine learning methods can be used to learn the predictive model, and those having ordinary skill in the art will be capable of selecting a particular method. The present embodiments illustrate predictive models using decision trees, but it should be understood that any appropriate predictive model and machine learning method may be selected. A decision tree provides a set of rules to determine a particular outcome. A tree 400 has a depth (also referred to as height) that refers to the distance of a node 402 from the root of the tree. Depth 0 refers to the root 404 of a tree. Depth 1 refers to nodes connected to the root of the tree by 1 edge 406. The depth increments by 1 for every subsequent edge 406. Leafs 408 represent the decision reached by the tree 400. If a decision tree is very general, it has fewer splitting rules, and as a result a larger number of samples (in our case execution traces) conform to the rules and as a result a model mined from the larger number of traces will tend to be more dense.

In the example of FIG. 4, the decision tree 400 represents a predictive model for the outcome of whether a given driver in an accident will be found at fault. The attributes 208 of a corresponding process model 200 may be used to glean this information. For example, the more execution traces that pass through a given edge 406 may represent an attribute 208 of a process model 200 that deals with a driver's age. If most execution traces that pass through a "less than eighteen" node result in the outcome of the driver being at fault, then the predictive model encapsulates that information.

There are several ways to make a decision tree 400 more general, as provided in block 114 of FIG. 1. Instead of gathering samples at the leaf level 408 of a decision tree 400, one can move up the tree and collect samples higher up. For example, in the tree 400 in FIG. 4, at depth 3 at the leaf level, at leftmost leaf node "Driver's Fault", the traces that fit into this category need to have Age of Driver >18, Gender=Male, Number of Years Insured <5. However, if one moves up the tree at depth 1, the traces that fit this category are traces of all drivers whose age is >18. The number of traces that satisfy this criteria at depth 1 are much greater than the number of traces that satisfy the criteria for the leftmost leaf node at depth 3. This modification would simplify the refined process model to be a simple determination based on driver age.

Figure 5:
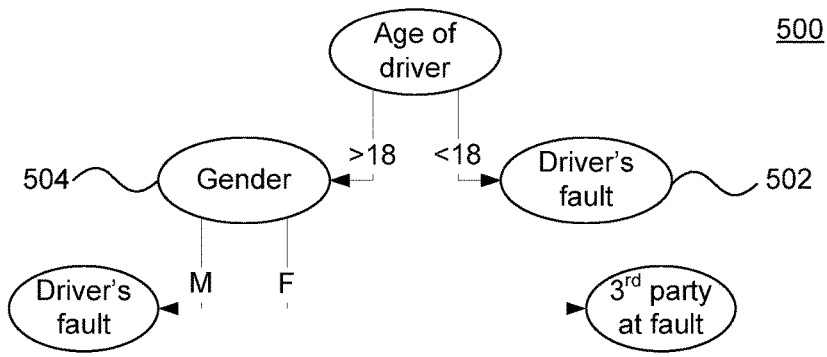
FIG. 5 is a diagram of a refined predictive model in accordance with the present principles.

Referring now to FIG. 5, an exemplary decision tree 500 is shown after modifying the minimum number of samples needed for a leaf node. This can be specified as a parameter in many decision tree learning algorithms. If the number of samples allowed in a leaf node is raised to a higher number, the tree becomes more general and has fewer leaves. In the example shown in FIG. 5, the proportion of traces that result in a determination of the driver being at fault is higher than in FIG. 4. If execution traces are mined using the higher minimum in block 118, the resulting process model will be denser due to having a greater number of execution traces that match the target condition of the driver being at fault.

Another way to change the specificity of the probabilistic model is to modify a confidence threshold that controls the amount of allowable error. For example, if the tree 400 has a high allowable error (and hence a low confidence threshold), the tree could be much deeper, growing more concise with each level. On the other hand, if a low allowable error (and hence a high confidence threshold) is used, the tree will tend to be more specific as only those nodes 402 with a high degree of confidence will remain.

Figure 6:
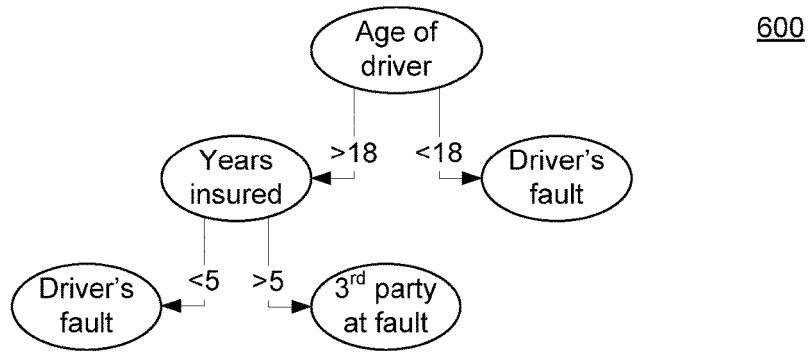
FIG. 6 is a diagram of a refined predictive model in accordance with the present principles.

Referring now to FIG. 6, a decision tree 600 is shown after the replacement of a subtree with its leaves. This makes the tree more generic by essentially moving a subtree up to a lesser depth, removing any other subtrees that it might displace. In this case, the "Number of years insured" node is moved up directly under the "Age of driver" node, removing the "Gender" and "Age of car" nodes.

Instead of making the predictive model more general, the user may desire to make the model more specific. In other words, the process model may be too simple to provide useful information. Exemplary techniques for making the process model more specific may include increasing the depth at which samples are collected, decreasing he minimum number of samples needed for leaf nodes, increasing the confidence threshold, and undoing any subtree replacements or raises that have previously been performed. These methods invert the methods described above for making the model more general.

Figure 7:
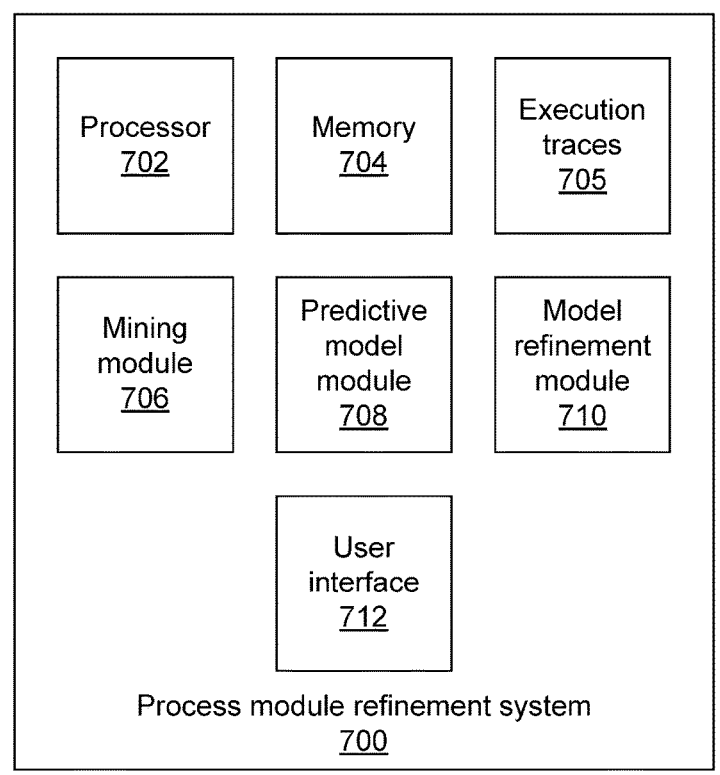
FIG. 7 is a block diagram of a system for mining and refining a process model in accordance with the present principles.

Referring now to FIG. 7, a process module refinement system 700 is shown. The system 700 includes a processor 702 in communication with memory 704. The memory 704 stores execution traces 705 that include in, e.g., a database or other appropriate data management system. A mining module 706 uses processor 702 to mine the execution traces 705 according to a specified outcome to generate a process model. A predictive model module 708 extracts attributes from the process model and learns a predictive model from the attributes. A model refinement module 710 determines whether the process model should be more sparse or more dense and refines the process model by adjusting the predictive model. The mining module 706 can then perform mining on an updated set of execution traces to form the new process model. A user interface 712 may be used to allow a user to judge whether a given process model is too dense or too sparse. Alternatively, this task may be performed by processor 702.

Having described preferred embodiments of a system and method for iterative refinement of pathways correlated with outcomes (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for refining a process model, comprising:
   determining whether a process model is too dense or too sparse;
   learning a predictive model from execution traces to predict an outcome;
   modifying the predictive model with a processor responsive to the determination of whether the process model is too dense or too sparse; and
   mining a refined process model using updated traces from the modified predictive model based on attributes present in the modified predictive model.

2. The method of claim 1, wherein learning the predictive model comprises extracting a set of attributes from the execution traces.

3. The method of claim 2, wherein attributes include steps and data values in a process.

4. The method of claim 2, wherein learning the predictive model comprises:
   forming a matrix having rows that represent individual execution traces and columns that represent individual attributes; and performing machine learning on the matrix to generate the predictive model.

5. The method of claim 1, wherein the predictive model is represented as a binary decision tree.

6. The method of claim 5, wherein modifying the predictive model comprises modifying a tree depth at which samples are collected.

7. The method of claim 5, wherein modifying the predictive model comprises modifying a minimum number of samples needed in a leaf node.

8. The method of claim 5, wherein modifying the predictive model comprises replacing a branch with a subtree of that branch.

9. The method of claim 1, wherein modifying the predictive model comprises modifying a confidence threshold that controls an amount of allowable error in the predictive model.

10. The method of claim 1, further comprising repeating said steps of determining, learning, modifying, and mining a refined process model until the step of determining determines that the process model is neither too sparse nor too dense.

11. A computer readable storage medium comprising a computer readable program for refining a process model, wherein the computer readable program when executed on a computer causes the computer to perform the steps of:
   determining whether a process model is too dense or too sparse;
   learning a predictive model from execution traces to predict an outcome;
   modifying the predictive model with a processor responsive to the determination of whether the process model is too dense or too sparse; and
   mining a refined process model using updated traces from the modified predictive model based on attributes present in the modified predictive model.

12. A system for mining a process model, comprising:
   a predictive model module configured to learn a predictive model to predict an outcome from the execution traces; and
   a model refinement module comprising a processor configured to determine whether the process model is too dense or too sparse, to modify the predictive model responsive to said determination, and to trigger the mining module to mine a refined process model using updated traces from the modified predictive model based on attributes present in the modified predictive model.

13. The system of claim 12, wherein the predictive model module is configured to extract extracting a set of attributes from the execution traces.

14. The system of claim 13, wherein the predictive model module is configured to form a matrix having rows that represent individual execution traces and columns that represent individual attributes and to perform performing machine learning on the matrix to generate the predictive model.

15. The system of claim 12, wherein the predictive model is represented as a binary decision tree.

16. The system of claim 15, wherein the model refinement module is configured to modify a tree depth at which samples are collected.

17. The system of claim 15, wherein the model refinement module is configured to modify a minimum number of samples needed in a leaf node.

18. The system of claim 15, wherein the model refinement module is configured to replace a branch with a subtree of that branch.

19. The system of claim 12, wherein the model refinement module is configured to modify a confidence threshold that controls an amount of allowable error in the predictive model.

20. The system of claim 12, wherein the model refinement module is further configured to iteratively trigger said determination of whether the process model is too dense or too sparse, said modification of the predictive model, and said mining of a refined model until it is determined that the process model is neither too sparse nor too dense.

\* \* \* \* \*